United States Patent [19]
Misiak

[11] 4,038,774
[45] Aug. 2, 1977

[54] FISHING PLUG

[76] Inventor: Carl W. Misiak, 31395 Minton, Livonia, Mich. 48150

[21] Appl. No.: 664,021

[22] Filed: Mar. 4, 1976

[51] Int. Cl.² ........................................... A01K 85/00
[52] U.S. Cl. ................................. 43/42.09; 43/42.23; 43/42.46; 43/42.47
[58] Field of Search ............... 43/42.09, 42.23, 42.46, 43/42.47

[56] References Cited

U.S. PATENT DOCUMENTS

| | | | |
|---|---|---|---|
| 810,017 | 1/1906 | Ackerman | 43/42.09 |
| 1,334,249 | 3/1920 | Lane | 43/42.47 X |
| 2,003,550 | 6/1935 | Muller | 43/42.46 X |
| 2,494,384 | 1/1950 | Gadzinski et al. | 43/42.09 X |
| 2,618,096 | 11/1952 | Wagner | 43/42.23 X |
| 2,871,610 | 2/1959 | Welch | 43/42.46 |
| 3,462,871 | 8/1969 | McVay | 43/42.47 |

Primary Examiner—Robert Peshock
Assistant Examiner—Daniel J. Leach
Attorney, Agent, or Firm—Charles W. Chandler

[57] ABSTRACT

A removable control wing is mounted on the forward end of a fishing plug. In one embodiment, the control wing has a pair of lateral tabs supported such that the plug rotates about its longitudinal axis as it is being pulled through the water. In another embodiment, the control wing supports a nose-like tab which is so bent that the plug moves in an erratic motion as it is being pulled through the water.

2 Claims, 5 Drawing Figures

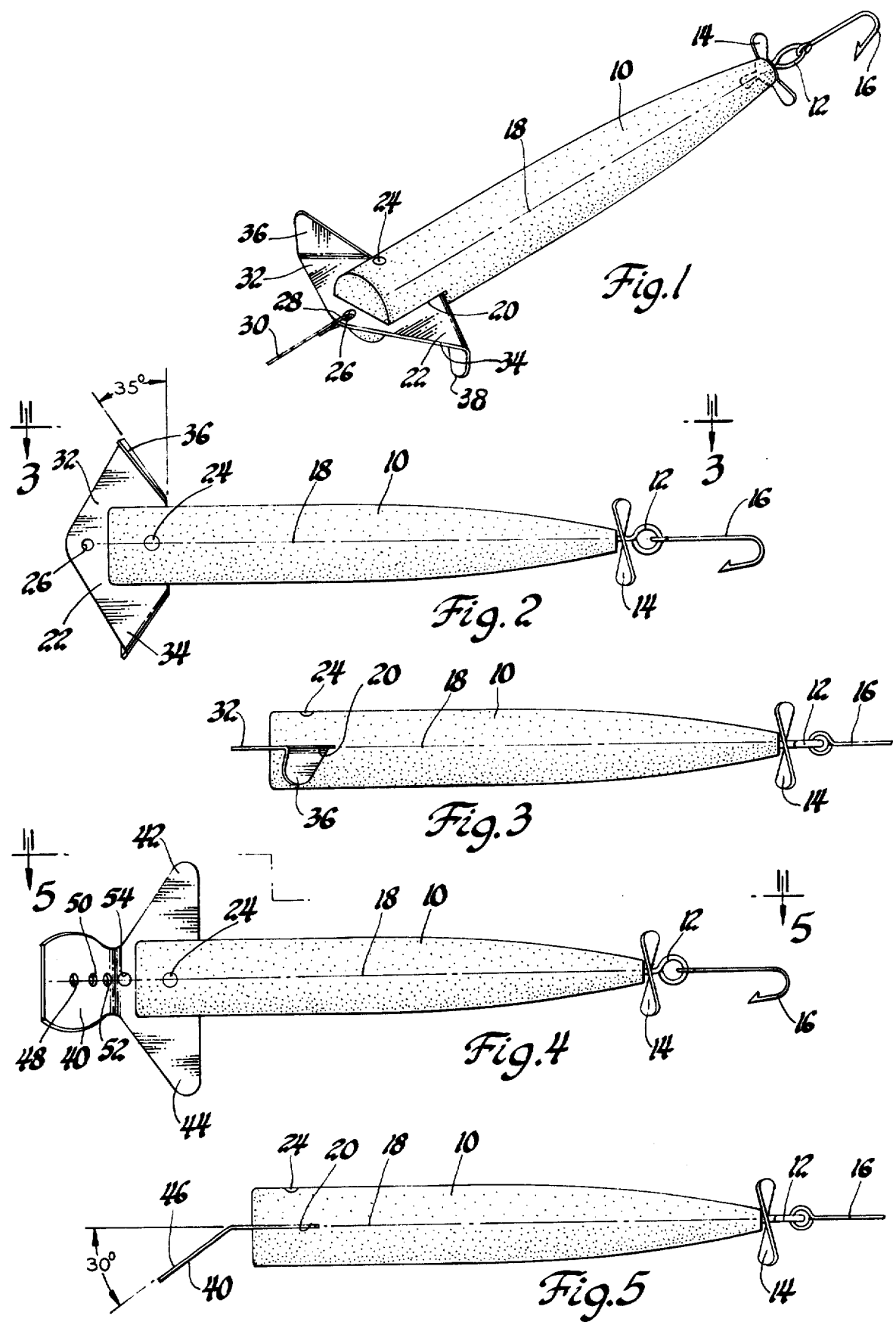

FISHING PLUG

BACKGROUND OF THE INVENTION

This invention is related to fishing plugs and more particularly to a plug having a control member forming a pair of laterally disposed wings on opposite sides of the forward end of the plug and a tab carried by the wings to provide a non-linear motion to the plug as it is being pulled through the water.

SUMMARY OF THE INVENTION

One of the broad purposes of the present invention is to provide a fishing plug formed of a buoyant material having a control member mounted on the forward end of the plug, the control member having a pair of wings on opposite sides of the body and a tab so bent as to define the motion of the plug as it is being pulled through the water. Another purpose of the invention is to provide a fishing plug having a removable control member that permits the user to exchange the control member according to the type of plug motion that he desires in the water.

Still further objects and advantages of the invention will become apparent to those skilled in the art to which the invention pertains upon reference to the following detailed description.

DESCRIPTION OF THE DRAWING

The description refers to the accompanying drawing in which like reference characters refer to like parts throughout the several views, and in which:

FIG. 1 is a perspective view of a fishing plug illustrating the preferred embodiment of the invention;

FIG. 2 is a plan view of the preferred plug;

FIG. 3 is a view as seen along line 3—3 in FIG. 2;

FIG. 4 is a plan view of another embodiment of the invention; and

FIG. 5 is a view as seen along line 5—5 of FIG. 4.

DESCRIPTION OF THE PREFERRED EMBODIMENT

Now referring to the drawing, a preferred fishing plug has an elongated tapered body 10 formed of a buoyant material such as a lightweight plastic, however, it could also be formed of wood or other suitable material such that body 10 tends to float when it is disposed in water.

A metal eye 12 is connected to the rearward end of body 10 and a spinner 14 is rotatably mounted on eye 12. Conventional fish hook means 16 is connected to eye 12 in the manner well known to those skilled in the art.

Body 10 is elongated and has an imaginary longitudinal axis 18. Body 10 also has a slot 20 formed adjacent the forward end of the body adjacent longitudinal axis 18. A metal control member 22 is received in slot 20. Control member 22 is preferably formed of a sheet of aluminum or other appropriate non-rusting material, such as brass. A pin 24, mounted on body 10, removably connects control member 22 to the body. Pin 24 can be removed to exchange the control member. Control member 22 preferably has planar surfaces coinciding with longitudinal axis 18, and has an opening 26 along the longitudinal axis for receiving a fastener 28 for connecting fish line 30.

Control member 22 extends beyond the sides of body 10 to form a first wing 32, and a second wing 34, the pair of wings being disposed on opposite sides of the body.

Control member 22 also has a tab 36 formed by bending the rearward edge of wing 32 along a bend disposed at an angle of about 55° with respect to longitudinal axis 18 of the body. The rearward edge of wing 34 is also bent in the opposite direction with respect to tab 36 to form a tab 38 along a bend at an angle of about 55° with respect to longitudinal axis 18. The two tabs are bent at an angle of about 90° with respect to their respective wings.

The advantage of the two tabs is each forms a frontal surface that extends from the side of body 10 outwardly toward the end of its respective wing. Since they are bent in opposite directions with respect to one another, the two tabs cause body 10 to move in a spiral motion as it is being pulled through the water by fish line 30. This motion then attracts fish (not shown) swimming in the water which become attached to hook 16.

FIGS. 4 and 5 show another embodiment of the invention in which control member 22 has been replaced by control member 40. Control member 40 is preferably formed of a sheet of aluminum and is so connected by pin 24 as to form a pair of tapered wings 42 and 44 which extend in opposite lateral directions from the forward end of body 10.

The forward end of control member 40 is bent toward one side of longitudinal axis 18 to form a tab 46. Tab 46 is bent at an angle of about 30° with respect to longitudinal axis 18. The amount of the angle can be selected to adjust the nature of the motion of body 10 as it is being pulled through the water. Control member 40 has a series of openings 48, 50, 52, and 54 for receiving fastener 28.

It is to be noted that the openings 48 – 54 are disposed adjacent longitudinal axis 18 so that the user can adjust the motion of the fish plug as it is being pulled through the water depending upon the particular opening to which he has connected fish line 30.

Control member 40 causes body 10 to have a side-to-side motion as it is being pulled through the water that tends to attract fish to the fishing plug and the hook 16. It is also to be noted that by making control members 22 and 40 interchangeable that the user can easily adjust the plug motion in the water.

Having described my invention, I claim:

1. A fishing plug, comprising:
an elongated body formed of a buoyant material, and having a blunt forward end extending perpendicular to the longitudinal axis of the body, a tapered rearward end, said body having a slot in said forward end along the longitudinal axis, the slot having a length less than ¼ the length of the body;
fish hook means connected to the body;
a thin control member received in the slot to form a first wing integrally connected to a second wing such that the first wing is disposed on the opposite lateral side of the body as the second wing, each wing having a rearward edge forming a planar tab at substantially 90° to the plane of said control member disposed at an angle of about 55° with respect to that portion of the longitudinal axis of the body, passing through the blunt forward end thereof, the tab on the first wing being bent in the opposite direction with respect to the tab on the second wing, the thin control member having a first opening disposed in the slot and a second opening for connection to a fishing line, the second opening being spaced from the blunt forward end of the body and aligned with said longitudinal axis, a pin carried on the body and received in the first opening of the control member to releasably prevent removal of the control member from the body, whereby the body moves in a non-linear motion as it is being pulled through the water by a fish line connected to the second opening of the control member.

2. A fishing plug, comprising:

an elongated body formed of a buoyant material and having a blunt forward end extending perpendicular to the longitudinal axis of the body, a tapered rearward end, said body having a slot in said forward end along the longitudinal axis, the slot having a length less than ¼ the length of the body;

fish hook means connected to the body;

a thin control member received in the slot to form a first wing integrally connected to a second wing such that the first wing is disposed on the opposite lateral side as the second wing, said wings each having a substantially triangular configuration including a linear rearward edge disposed at right angles to the longitudinal axis of the body in the same plane as said control member and a forward edge extending forward of the blunt end of the body to form a tab disposed at an angle of about 30° with respect to said longitudinal axis, said control member having a first opening disposed in the slot and a second opening spaced forward of the blunt forward end; and a pin carried on the body and received in the first opening of the control member for releasably preventing removal of the control member from the body whereby the body moves in a non-linear motion as it is being pulled through the water by a fish line connected to the control member.

* * * * *